United States Patent

La Marca

[15] 3,675,339
[45] July 11, 1972

[54] KEYBOARD TEACHING MACHINE

[72] Inventor: Joseph LaMarca, 299 W. 12th Street, New York, N.Y. 10014

[22] Filed: Oct. 26, 1970

[21] Appl. No.: 83,839

[52] U.S. Cl. ....................................................35/6
[51] Int. Cl. ..........................................G09b 7/02
[58] Field of Search ..............................35/5, 6, 9

[56] References Cited

UNITED STATES PATENTS 3,584,398  6/1971  Meyer et al. ........................35/6

Primary Examiner—Robert W. Michell
Assistant Examiner—J. H. Wolff
Attorney—Michael Ebert

[57] ABSTRACT

A teaching machine for training students to acquire typewriter or other keyboard skills. The machine includes a display device adapted to visually present in random order characters of the type appearing on the keyboard, the presentation being made during a predetermined test cycle. In the "Match" mode of the machine, the student seeks to press a key corresponding to the character displayed, and only if he succeeds in effecting a match will this event be scored by a counter and a new character presented. In the "Pace" mode, the characters are continually presented during the test cycle at timed intervals, whether or not a match is effected, but only when a match is effected is the score counter advanced.

7 Claims, 3 Drawing Figures

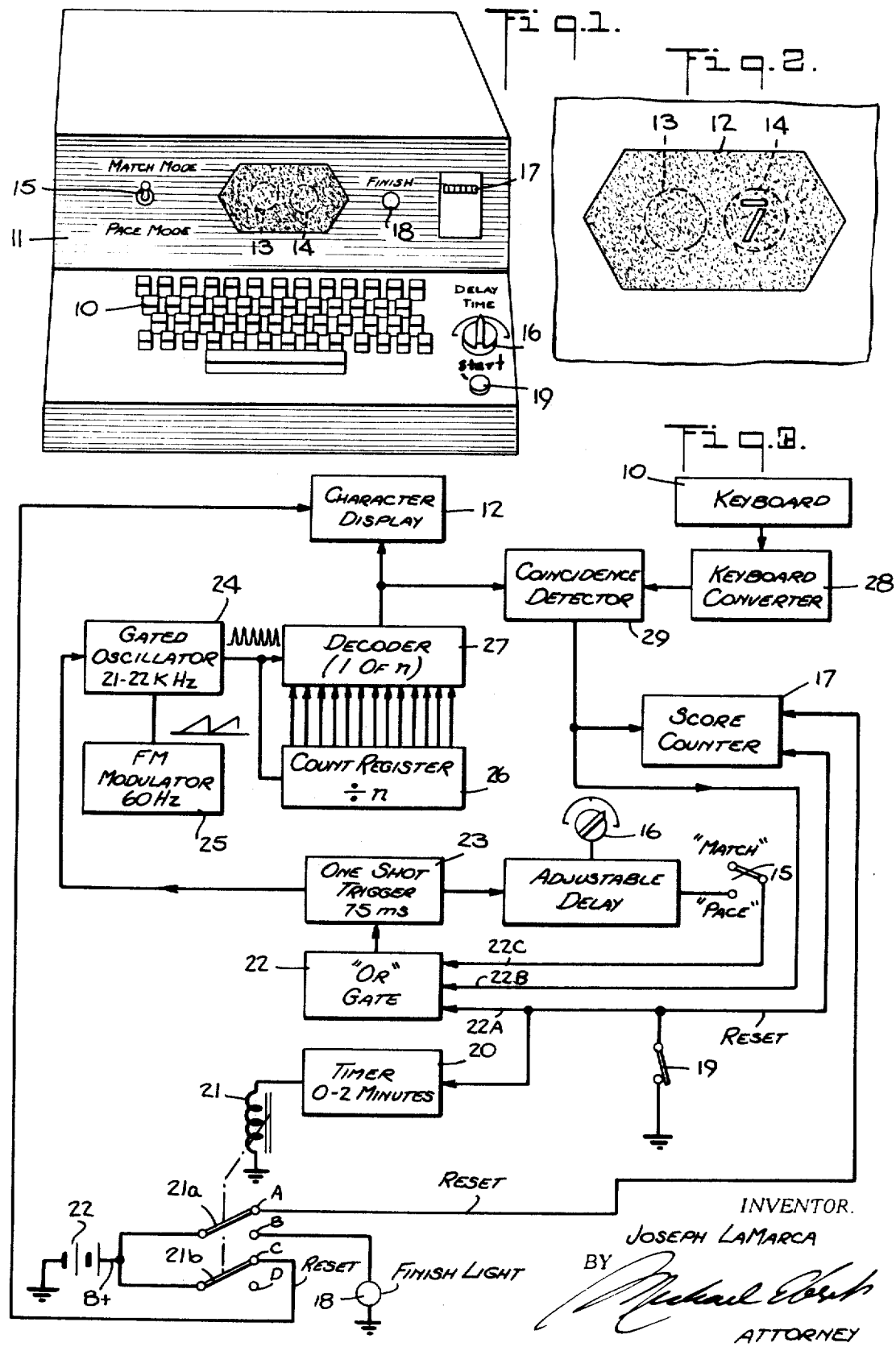

KEYBOARD TEACHING MACHINE

BACKGROUND OF THE INVENTION

This invention relates generally to teaching or training machines, and more particularly to a machine adapted to assist a student in acquiring keyboard skill and to facilitate character-recognition.

The modern industrial age is characterized not only by its enormous and expanding body of knowledge and data, but also by the machines and techniques which have been developed to analyze, process, and communicate this information. Though machines and computers of various types and degrees of complexity exist to carry out these functions, in almost all instances the information to be processed or communicated is read into the machine by means of a manually operated keyboard whose keys bear appropriate letters, numbers, marks or symbols (hereinafter generically referred to as "characters").

The basic and universal tool for printing information in a communicable form is the typewriter. But in addition to typewriters having standard and specialized keyboards, information is recorded or transmitted by teletypewriter, stenotypewriters and many other types of keyboard-operated instruments. Statistical, accounting and financial transactions also involve the use of key-operated machines having appropriate keyboards. Special keyboards are available to process or record phonetic, chemical, engineering and mathematical symbols, and terminal keyboards are employed for feeding information into computers and other data-processing machines.

In industry, the role of the keyboard is assuming a new dimension as communications media move into the extensive use of time-multiplex and time-sharing systems to meet the exploding data requirements of computer technology. These systems, which offer significant economic, engineering and performance advantages over present data-transmission methods, are accompanied by low-speed asynchronous data channels that establish the connections and coordinate the exchange of data. The channels in such systems are almost exclusively controlled by a keyboard-operated terminal device.

The proliferation of keyboard-operated machines has been accompanied by a need for personnel capable of operating the keyboards. Yet despite the growing sophistication of such machines and their reliance on the keyboard for feeding in data to be processed or recorded, the methods for teaching keyboard skills have remained relatively primitive and ineffective.

The basic technique in current use for acquiring proficiency on a typewriter is essentially no different from the practiced almost a hundred years ago when the typewriter was first put to commercial use. The usual procedure is for a student to type out a line or more of a sample text and then compare the results with the original. This procedure is so inefficient that it takes several months for a typical student to acquire a modest degree of keyboard proficiency. Where the student has a low level of literacy and is slow to recognize characters, the learning process is even more painful.

Traditional methods of typing instruction may be greatly hindered by poor language comprehension, undeveloped attention and memory span, and the inability to follow directions, this being further aggravated by the lack of qualified instructors, teaching materials and equipment. Similar difficulties are experienced when teaching students keyboard skills for computer terminals or other forms of keyboard-operated machines. Here, too, the existing teaching technique entails a comparison of the output of the machine as produced by the student with the original data or text fed thereto.

Because existing techniques for training personnel in the operation of keyboards are time-consuming, expensive and inefficient, students are discouraged from acquiring such skills and the supply of proficient keyboard operators is inadequate to satisfy the growing demand therefor.

BRIEF DESCRIPTION OF THE INVENTION

In view of the foregoing, it is the main object of the invention to provide a teaching machine for assisting students in acquiring keyboard skills, the machine acting to condition the student's behavior in accordance with the principles of positive reinforcement.

More specifically, it is an object of the invention to provide a compact, low-cost keyboard teaching machine which includes a keyboard of the type to be taught, the machine having a display device which presents at random the characters of the type appearing on the keyboard, whereby when the student presses a key corresponding to the character displayed, he is immediately rewarded with a score.

A significant feature of the invention is that the machine is adapted to operate in either the "Match" mode or in the "Pace" mode so that the student is able to select the mode appropriate to his existing state of skill. In the "Match" mode, a new character is presented only after the student has succeeded in matching the previously-displayed character, regardless of how many tries he has made, so that the rate of character presentation is coordinated with the student's ability to effect a match. In the "Pace" mode, which is appropriate to a more advanced student, the random characters are presented periodically at a predetermined rate which is adjustable, so that new characters appear whether or not a match has been effected. In either mode, the number of matches effected by the student during a timed test cycle is scored, each match being indicated by a "click" advance of a score counter so that there is an instant feedback of results.

Briefly stated, these objects are attained in one preferred embodiment of the invention in a system wherein a display device formed by Nixie tubes or other character-forming devices is adapted to display all of the characters of the keyboard of the type being taught, which characters may be marks, numbers, letters, or any other symbolic forms of intelligence. The character-forming devices are actuated by a pulse source having a varying repetition rate or other means adapted to bring about a sequential display of selected characters of the keyboard in a totally random fashion. The keyboard operated by the student is provided with a converter to indicate which key has been depressed, which indication is compared with an indication representing the character being presented to produce a coincidence signal when a match is effected. The coincidence signal serves to advance a score counter, and concurrently in the "Match" mode of operation of the machine, to cause the display device to present a new character. In the "Pace" mode of operation, the characters are sequentially presented at a periodic rate which is adjustable without regard to whether a match is effected.

The machine in accordance with the invention is not only a low-cost device and therefore requires only a modest investment to install, but it also minimizes teaching expenses, for it reduces the time necessary to acquire an acceptable level of skill and lightens the load on teaching personnel. The machine also serves to teach number and letter recognition through matching. The ability to quickly match letters and numbers greatly facilitates the learning process, this ability being enhanced by the machine.

OUTLINE OF THE DRAWINGS

For a better understanding of the invention, as well as other objects and further features thereof, reference is made to the following detailed description, to be read in conjunction with the accompanying drawing, wherein:

FIG. 1 is a perspective view of a preferred embodiment of a keyboard-operated teaching machine in accordance with the invention;

FIG. 2 is a separate view of the display and scoring sections of the machine; and FIG. 3 is a block diagram of the elements of the system incorporated in the machine.

DETAILED DESCRIPTION OF THE INVENTION

Referring now to the drawing, and more particularly to FIGS. 1 and 2, there is shown a keyboard-operated teaching machine in accordance with the invention, the machine including a keyboard 10 mounted on a console having a front panel 11. The nature of the keyboard depends on the instruction to be given, and if the student is to be trained to operate a standard typewriter keyboard such as that found on an IBM electric typewriter, then the teaching keyboard will be a replica of that keyboard and will contain the usual letters, numbers and symbols as well as a spacer bar. But if the instruction is to be given on another type of keyboard, such as that found on an accounting machine or a computer terminal, then a replica of that keyboard will be incorporated in the console.

Mounted on front panel 11 is a character-display window 12 which is adapted when a start switch 19 is pressed to present at random and with no prearranged order any one of the characters contained on the keyboard, even including, in the case of a standard typewriter, a symbol representing the spacer bar.

Useable for this purpose are so-called "Nixie" tubes made by the Burroughs Corp. and disclosed, for example, in U.S. Pat. No. 3,358,176. Such cold cathode, gaseous glow tubes are adapted to display characters, such as numbers, letters or symbols. Each Nixie tube includes a series of terminals which may be selectively connected to a power source to illuminate a desired character. Or the Nixie tubes may be of the segmented electrode type disclosed in U.S. Pat. No. 3,280,359 in which each character is displayed by electrically connecting and igniting different combinations of segments to provide displays of different characters.

By way of example, we shall assume that for purposes of training a student to use a standard typewriter having the letters of the alphabet as well as the numbers zero through nine and various symbols, the display is made capable of presenting any one of forty characters. To carry out these functions, two Nixie tubes 13 and 14 are used, side by side, the character load being divided between the two tubes, with numbers being displayed on one tube, the letters and symbols on the other. It is to be understood, however, that the invention is not limited to a display created by Nixie tubes, and that other available types of character-forming tubes or devices may be used to present characters in lottery fashion or at random.

The machine is capable of operating either in a "Match" mode or in the "Pace" mode, as determined by the setting of a switch 15 mounted on the front panel. In the "Match" mode, a character is presented by the display, at random, and if the student presses the key on the keyboard corresponding to this character, thereby effecting a match, the display will then erase the matching character and present a new character to be matched. Thus no new character will be presented until a match is achieved.

But in the "Pace" mode, characters are presented at random on the display at periodic intervals whose rate is determined by the setting of a time-delay control knob 16 (such as 10, 25 or 50 characters a minute). Even in the student presses no key or the wrong key, the presentation of characters continues without interruption during the operating cycle of the machine, which in practice may be timed to run for two minutes or a similarly short interval.

In the "Pace" or the "Match" mode, on each occasion the student presses the correct key corresponding to the character presented, this event is recorded by a digital score counter 17, the counter advancing one digit for each match. In the "Match" mode, the character display is indexed only if a match is effected, so that if it takes two or three tries before the student presses the right key, this fact is reflected in the amount of time required to effect a match. The operating cycle of the machine is fixed, and if, during, say, a 2-minute cycle, the student has been able to effect only 25 matches, the score counter 17 so indicates. The end of a test cycle is indicated by a finish light 18.

As the student gains proficiency, he will be able to improve his score in the "Match" mode, which means that with successive test cycles he will have succeeded in increasing the speed at which he is able to bring about a match, thereby permitting more characters to be displayed within the cycle time. The student is made aware of the match by the visible movement of the counter, which is initiated by an audible click. In the event the counter does not provide a click or other sound sufficiently loud to be heard when a match is effected, a clicking relay may be provided for this purpose.

But in the "Pace" mode, during the cycle time for any given setting of time-delay knob 16, a predetermined minimum number of characters will always be presented with a set delay between presentations, such as 26 characters per minute during a 2-minute cycle, or 39 characters per minute in the same cycle period, depending on the setting. In this mode, the score depends on how many of the characters presented during the cycle the student has been able to match, and should the student be able to effect matches at a faster rate than the set rate, the minimum will be exceeded. If, for instance, the delay knob is set at 50 characters per minute, a minimum of 100 characters will appear during the 2-minute cycle, and should be student be able to match, say, 96 out of 100 during the set delays, he receives a high score. But if the student succeeds in effecting matches at a greater rate, more characters will be presented and the score will be even higher.

Thus each time the student presses the appropriate key, he is instantly awarded with a score. After initial familiarization with the keyboard, which may be carried out in the "Match" mode, presenting the characters no faster than the student is able to effect a match, the system may be switched to the "Pace" mode, and the characters thereafter presented at a progressively greater pace with each new cycle as the student improves his score from play to play. The result is a rapid development of accurate, evenly paced finger movements. Thus the machine affords to the learner immediate feedback which improves his motivation and retentivity, and thereby accelerates the learning process. It also provides a record of the student's progress for his teacher.

The functional aspects of the teaching machine are predicated on the theory of learning behavior, known as operant reinforcement. The gist of this theory is that behavior is markedly influenced by changes arising as a consequence of a response. When an action produces a favorable consequence, this is called a positive reinforcement, for it encourages a repetition of continued behavior leading to favorable consequences.

In order, therefore, to promote fast and accurate key depressions, the teaching machine is adapted to positively reinforce such behavior. Since the machine is arranged so that no consequences follow key depressions that are inaccurate or too slow, the student operating the machine is not motivated to repeat such behavior which then becomes less frequent. And because the machine awards each correct key depression immediately after it occurs, it fosters an increase in the rate of correct responses. It has been found that the "click" advance of the score counter serves as a positive reinforcer leading, with continued practice, to higher total scores.

Referring now to FIG. 3, there is shown, in block diagram form, one preferred embodiment of a circuit arrangement for carrying out the function described above.

When the student closes start switch 19, this initiates the operation of a timer 20. This timer may be any available form of electronic or electromechanical device that can be preset for a desired cycle time, such as two minutes, at the end of which a relay 21 is actuated. The arrangement is such that when start switch 19 is closed, timer 20 is immediately and automatically preset, the timer then proceeding to time out, whereby at the conclusion of the timing period, relay 21 causes the ganged armatures 21a and 21b to transfer from the normally engaged fixed contacts A and C to fixed contacts B and D.

Armatures 21a and 21b are connected to a DC voltage source B+ such that when contacts A and C are engaged, DC In order to learn actual information-processing techniques, the character display for the machine may be produced by a pre-recorded visual character program carried, for example, on a projector film reel or casette or equivalent means adapted to sequentially present characters in accordance with a pre-arranged program to simulate inputoutput procedures for telecommunication, computerized data systems and automatic tool programming. This arrangement may also be used as an aid in reinforcing elementary concepts in phonics, spelling, multiplication tables, and problem solving. It is also applicable to more advanced associations and relationships, such as learning chemical, engineering, mathematical, statistical, financial and foreign-language symbology.

While there has been shown and described a preferred embodiment of keyboard teaching machine in accordance with the invention, it will be understood that many changes and modifications may be made therein without, however, departing from the essential spirit of the invention.

I claim:

1. A machine adapted to train a student in acquiring proficiency in the operation of apparatus provided with a keyboard whose keys are marked by letters, numbers or other types of characters, said machine being operable in the Match mode or in the Pace mode and comprising:
   A. a training keyboard corresponding to the keyboard incorporated in said apparatus and having means to produce an indication of which key is being depressed by the student,
   B. display means to present in random order characters of the type carried on the training keyboard and having means to produce an indication of which character is being displayed,
   C. a detector coupled to said training keyboard and to said display means to produce an output signal only when a keyboard indication is coincident with a display-means indication, which coincidence occurs only when the student presses a key matching the character displayed,
   D. a counter coupled to said detector and adapted to advance one count each time a match occurs, and
   E. selective means to render said machine operable in either the Match mode or the Pace mode, the machine in the Match mode including means to render the machine operative for a test cycle having a fixed duration, and means operable during the test cycle to erase the character displayed by said display means and to present a new character each time a match is effected, the machine in the Pace mode making use of said means to render the machine operative for a test cycle and further including means during said test cycle, to cause said display means sequentially to present a minimum number of characters at random with a preset delay between each presentation unless a match is effected.

2. A training machine as set forth in claim 1, wherein said means to produce an indication of which key has been depressed is constituted by a switching matrix operatively coupled to the keys of said training keyboard to produce a closure of the switch corresponding to the depressed key.

3. A machine as set forth in claim 1, further including means to adjust said delay.

4. A machine as set forth in claim 1, wherein said display means includes Nixie tubes.

5. A machine as set forth in claim 4, wherein said Nixie tubes are selectively operated by a pulse counter causing particular characters to be displayed, depending on the count registered in the counter.

6. A machine as set forth in claim 5, further including a random pulse generator for applying pulses to said counter.

7. A machine as set forth in claim 1, further including a timer which is activated by a start switch to render the machine operative for said predetermined test cycle, and means to indicate the completion of said test cycle.

* * * * * operating voltage is applied to character-display 12 and to score counter 17, and when, at the end of the timing interval, the armatures are shifted, DC voltage to the display and score counter is cut off and is applied by way of contact C to finish light 18 to energize same, contact D being blank.

An "OR" gate 22 is provided having three inputs 22A, 22B and 22C. Start switch 19 is connected both to input 22A or the "OR" gate and to the score counter 17, such that when switch 19 is closed, the score counter is reset in preparation for the test cycle just initiated, and "OR" gate 22 is actuated to produce an output which is applied to a one-shot trigger 23. An "OR" gate is an electronic device that produces a standardized output when a voltage is applied to any one input, so that in the gate shown, an output will be yielded when a voltage input is applied to input 22A or to input 22B or to input 22C.

One-shot trigger 23 is activated by the output of OR gate 22 to produce, each time the "OR" gate operates, a single square-wave pulse whose duration is determined by the time constant of the trigger. In practice, trigger 23 may be set to produce a gating pulse of 75 milliseconds' duration.

Trigger 23 serves to activate a gated oscillator 24 for the duration of the trigger pulse. Oscillator 24 is a voltage-responsive high-frequency oscillator whose output frequency is a function of an applied voltage derived from a low-frequency sawtooth oscillator 25 (i.e. 60 Hz). Thus the sawtooth voltage applied to voltage-responsive oscillator 24 acts to frequency-modulate the oscillator.

The number of cycles generated by high-frequency oscillator 24 during any 75-millisecond gating interval is not predetermined, but assumes a new value with each gating interval. For example, assuming an oscillator 24 whose output frequency varies between 21 to 22 KHz when modulated by a 60 Hz sawtooth voltage, whenever start switch 19 is closed to fire trigger 23 which gates the oscillator on for 75 milliseconds, the output of the oscillator may vary from 1,575 to 1,650 cycles per second. This depends on the point on the rising sawtooth voltage which corresponds to the leading edge of the gating pulse at any given gating period. Thus in one instance, when the gating period begins, the sawtooth may be close to zero voltage, whereas in a subsequent period, it may be close to its peak value. Hence the output of oscillator 24 is random.

The output of oscillator 24 is applied to an electronic counter 26 which in practice may be a chain of flip-flop stages to register the number of pulses applied thereto by the oscillator during the gating period. The counter itself has $n$ stages, depending on the number of keys on the keyboard 10, which number corresponds to the number of characters in display 12.

Because the number of pulses or cycles produced by oscillator 24 during any gating period is random, the output of electronic counter 26 is a random number. This count is decoded by a decoder 27 whose output is used to energize character-display 12. The decoder may consist of a diode matrix having output lines adapted to apply an actuating voltage to that terminal (or group of terminals) producing a character on the display corresponding to the count. If, for example, with a 40-character system, count 24 represents the letter Z, when this count appears, the letter Z will be displayed.

The student observes the character presented by the display and responds by depressing a key on keyboard 10 which he believes will effect a match. The keys on the keyboard are operatively coupled to a switching matrix 28, such that a particular switch is closed each time its related key is depressed.

The output of switching matrix 28 is compared in a coincidence detector 29 with the output of count decoder 27. In practice, the output lines of the diode matrix of decoder 27 may be connected to the switches in the keyboard matrix 28 in detector 29 so that coincidence occurs only when the active line of the decoder is connected to a closed switch in the keyboard matrix, thereby producing the desired coincidence. Thus only when the correct key is depressed will coincidence take place in detector 29 to produce an output pulse to actuate mechanical score counter 17, thereby advancing the counter one count.

The output of detector 29 is also applied to input 22B of OR gate 22. When coincidence occurs, this causes trigger 23 to produce another 75-millisecond pulse which in turn gates on oscillator 24, causing a new character to be presented by the display, at which point the student again seeks to effect a match.

When mode switch 15 is in the "Match" mode, no input is applied to input 22C of the OR gate 22, and no new character will be presented until a match is attained as indicated by the coincidence pulse applied to input 22B. When, therefore, the timer 20 runs out at the end of its preset period (i.e., 2 minutes), the score recorded on counter 17 will depend on the number of times during the test cycle the student has been able to effect a match. Hence new characters are presented only after the student has effected a match.

In the "Match" mode, the score will be low if the student is slow to effect a match or if he presses the wrong key one or more times before pressing the correct key to effect a match. Should the student be able to quickly effect a match each time a character is presented, the number of matches attained in the 2-minute test cycle will give rise to a high score, but in neither the low-score nor high-score situation is the student advised as to how many errors he has made. Hence the system is based on positive reinforcement of behavior, the student being encouraged to improve his score with repeated plays.

When mode switch 15 is set to the "Pace" mode, the output of trigger 23 is applied through an adjustable delay 16 to input 22C of "OR" gate 22 to complete a feedback network causing the trigger to be re-actuated at a rate determined by the delay setting. In practice, the delay adjustment may be arranged to provide a character presentation of 26, 34, 39, 48, 50, 67, 77, 88 or 139 characters per minute, depending on the delay setting.

Thus in the "Pace" mode, if the student sees a character and presses no key or the wrong key, a new character will nevertheless be presented after a selected delay period. This will continue until the test cycle time runs out. If the student, to use an extreme example, fails to press a single correct key in the test cycle period, he will receive a zero score in the "Pace" mode. But if the student is able to match the characters even faster than their presentation in the "Pace" mode, he may achieve a score even higher than the pace setting of the machine.

For example, if the machine is paced to present 50 characters a minute (100 characters during the 2-minute test cycle), the student, if he effects a quick match, is not required to wait for the delay circuit to present the next character, for with each match, the resultant coincidence pulse from detector 29, which is applied to "OR" gate input 22B, operates trigger 23 to bring about a new character presentation.

While an electronic system has been shown to produce characters at random, a similar effect may be obtained mechanically as by means of a lottery wheel having characters thereon. By causing the wheel to spin in lottery fashion, the character appearing at a stop position may be optically displayed to the student, who then seeks to match this character on the keyboard, the score counter being advanced only if coincidence is attained. For this purpose, the wheel may be made of transparent material with the characters printed thereon, the wheel being driven and quickly braked each time a match is effected, or at a predetermined rate, depending on the operative mode. By the use of a motor whose speed is unregulated, the position assumed by the wheel with each action will be random. In some instances, it may be desirable to increase the probability of certain characters being presented. Thus since the letter E appears more frequently in a text than, say, the letter Q, in order to increase the number of appearances of E in a random operation, more than one E is included in the character display bank.